Jan. 18, 1949.                    J. B. REEVES                    2,459,340
ELECTRONIC ENERGY CONVERSION AND CONTROL SYSTEM
Filed April 14, 1944

Inventor
James B. Reeves
By [signature]
Attorney

Patented Jan. 18, 1949

2,459,340

UNITED STATES PATENT OFFICE 2,459,340

ELECTRONIC ENERGY CONVERSION AND CONTROL SYSTEM

James B. Reeves, Whitefish Bay, Wis., assignor to Cutler-Hammer, Inc., Milwaukee, Wis., a corporation of Delaware Application April 14, 1944, Serial No. 531,090

25 Claims. (Cl. 318—345)

1

The invention relates to electronic control particularly advantageous for but not limited to control of the acceleration and speed of a direct current motor supplied with energy from an alternating current source.

An object of the invention is to provide an improved electronic system for the control of energy supplied to a direct current motor by an alternating current source.

Another object is to provide for motor acceleration in a substantially stepless manner and to maintain the accelerating current throughout starting within a predetermined limit.

Another object is to provide a control system of the aforementioned character wherein the running current of a motor is controlled so as to maintain the motor speed substantially constant at different loads.

Another object is to provide a controller of the aforementioned type in which the speed of the motor may be maintained constant at any desired value within very wide limits.

Another object is to provide a control by which the duration of the current pulses passed by a gaseous discharge tube may be adjusted within wide limits.

Another and more specific object is to provide for controlling the effective unidirectional current passed by a plurality of gaseous discharge tubes for a constant selected value and to provide for adjustment of said value throughout a wide range.

Other objects and advantages will hereinafter appear.

Figure 1:
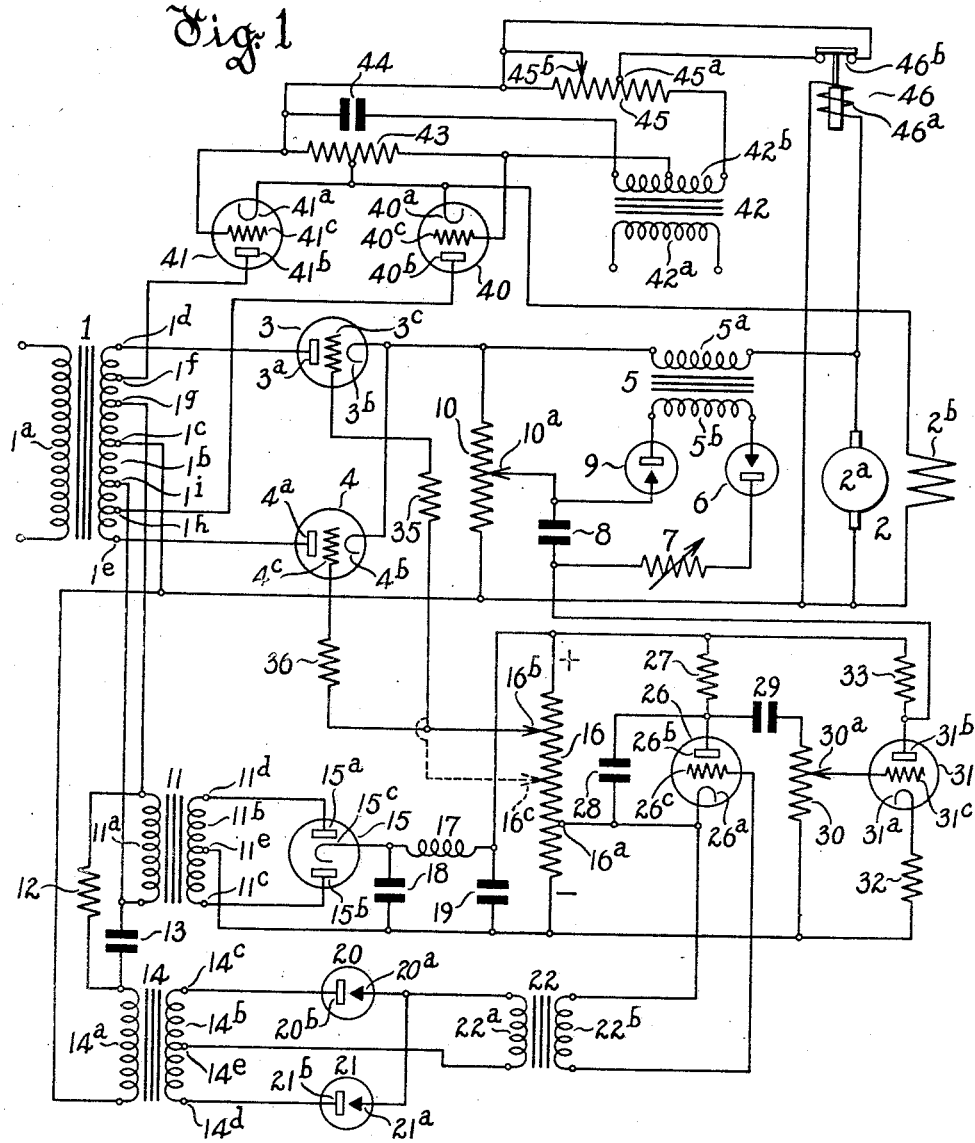
Figure 1 is a diagram of a system embodying the invention.

Referring to Fig. 1, the system comprises a transformer $1$, having a primary winding $1^a$, connectable to a source of alternating current supply, and a center tapped secondary winding $1^b$, provided with a number of additional taps as will be explained hereinafter.

The transformer supplies energy to the armature $2^a$ of a motor $2$, which is also provided with a field winding $2^b$. The winding $1^b$ has a center tap $1^c$, end taps $1^d$ and $1^e$, intermediate taps $1^f$ and $1^g$, located between the taps $1^d$ and $1^c$, and intermediate taps $1^h$ and $1^i$ located between the taps $1^e$ and $1^c$. The tap $1^d$ is connected to the anode $3^a$ of a gaseous discharge tube $3$, which is also provided with a cathode $3^b$ and a grid $3^c$.

2

The tap $1^e$ is connected to the anode $4^a$ of a gaseous discharge tube $4$, which has a cathode $4^b$ and a control grid $4^c$. The two cathodes $3^b$ and $4^b$ are connected through the primary winding $5^a$ of a transformer $5$ to one terminal of the armature $2^a$. The center tap $1^c$ of transformer $1$ is connected to the second terminal of the armature $2^a$. The transformer $5$ has a secondary winding $5^b$ which is connected in a loop with the half-wave rectifier $6$, the variable resistor $7$, the condenser $8$ and the half-wave rectifier $9$.

The two rectifiers $6$ and $9$ are so connected that current in said loop can flow only in one direction. A variable resistor $10$ having a movable contact $10^a$ is connected between the common point of the cathodes $3^b$ and $4^b$ and the center tap $1^c$ of the transformer $1$. The movable contact $10^a$ is connected to the common point of the condenser $8$ and the rectifier $9$. To control the currents of the tubes $3$ and $4$ the system is further provided with a transformer $11$, having a primary winding $11^a$, which is connected across the taps $1^g$ and $1^i$ of transformer $1$. A resistor $12$ and a condenser $13$ are connected in series with each other to form a circuit in parallel with the primary winding $11^a$. A third transformer $14$ has a primary winding $14^a$ and a secondary winding $14^b$. One terminal of winding $14^a$ is connected to the common point of the resistor $12$ and the condenser $13$, while the other terminal of said winding is connected to the center tap $1^c$. The transformer $11$ also has a center tapped secondary winding $11^b$. The end terminals $11^d$ and $11^c$ of said secondary winding $11^b$ are connected to the anodes $15^a$ and $15^b$, respectively, of a full-wave rectifier $15$, which is also provided with a cathode $15^c$.

Connected between the center tap $11^e$ of the winding $11^b$ and the cathode $15^c$ is a voltage divider $16$, said voltage divider being provided with an intermediate tap $16^a$ and one or two sliding contacts $16^b$ and $16^c$, respectively. An inductance $17$ is interposed in the connection between the cathode $15^c$ and the positive terminal of the voltage divider $16$. A smoothing condenser $18$ is connected between the cathode $15^c$ and the center tap $11^e$ and another smoothing condenser $19$ is connected across the end terminals of the voltage divider $16$. The anode $20^b$ of a rectifier $20$ of any suitable type is connected to the end terminal $14^c$ of the transformer winding $14^b$ and the anode $21^b$ of a similar rectifier $21$ is connected to the end terminal $14^d$. The cathodes $20^a$ and $21^a$ of rectifiers $20$ and $21$, respectively, are jointly connected to one end terminal of primary winding 22ª of a transformer 22. The other end terminal of said winding 22ª is connected to the center tap 14ᵉ of the winding 14. The transformer 22 has a secondary winding 22ᵇ.

A gaseous tube 26 has its cathode 26ª connected to the intermediate tap 16ª of the voltage divider 16, while its anode 26ᵇ is connected through a resistor 27 to the positive end terminal of the voltage divider 16. Connected between the cathode 26ª and the anode 26ᵇ is a condenser 28. The grid 26ᶜ of the tube 26 is connected to one terminal of the winding 22ᵇ, the other terminal of said winding being connected to the cathode 26ª. A condenser 29 is connected in series with a voltage divider 30 between the anode 26ᵇ and the negative terminal of the voltage divider 16. The voltage divider 30 is provided with an adjustable contact 30ª. A high vacuum tube 31 has its cathode 31ª connected through a resistor 32 to the negative terminal of the voltage divider 16, while the anode 31ᵇ of said tube 31 is connected through a resistor 33 to the positive terminal of the voltage divider 16. The anode 31ᵇ is also connected to the common point of the resistor 7 and the condenser 8. The grid 31ᶜ of tube 31 is connected to adjustable contact 30ª.

The sliding contact 16ᵇ of the voltage divider 16 is connected through a resistor 35 to the grid 3ᶜ of the tube 3 and also through a resistor 36 to the grid 4ᶜ of the tube 4. Under certain conditions a second sliding contact 16ᶜ is provided as shown in dotted lines in which case the grid 3ᶜ is connected through the resistor 35 to the sliding contact 16ᶜ and the grid 4ᶜ is connected through the resistor 36 to sliding contact 16ᵇ.

The field winding 2ᵇ of the motor is supplied with energy through a pair of gaseous electron tubes 40 and 41, having cathodes 40ª and 41ª, respectively, anodes 40ᵇ and 41ᵇ, respectively, and grids 40ᶜ and 41ᶜ, respectively. The anode 40ᵇ is connected to the intermediate tap 1ʰ, while the anode 41ᵇ is connected to the intermediate tap 1ᶠ. The cathodes 40ª and 41ª are jointly connected to one terminal of the field winding 2ᵇ, while the other terminal of said winding is connected to the center tap 1ᶜ.

A transformer 42 is provided with a primary winding 42ª, which receives energy from the same source as the winding 1ª. The transformer 42 has also a center tapped secondary winding 42ᵇ, the center tap being connected to the grid 40ᶜ, while a center tapped resistor 43 is connected between the grid 40ᶜ and the grid 41ᶜ. The center tap of the resistor 43 is connected to the common terminal of the cathodes 40ª and 41ª. One of the end terminals of the winding 42ᵇ is connected to one terminal of a condenser 44, the other terminal of said condenser being connected to the grid 41ᶜ. A variable resistor 45 is connected between the second end terminal of the winding 42ᵇ and the grid 41ᶜ. Said resistor 45 is provided with an intermediate tap 45ª and is also provided with a sliding contact 45ᵇ by means of which the value of the section of the resistor 45 nearest to the grid 41ᶜ may be varied.

Connected in parallel with the motor armature 2ª is the winding 46ª of a voltage responsive relay 46, which relay has normally closed contacts 46ᵇ connected between the intermediate tap 45ª of the resistor 45 and the grid 41ᶜ.

The system as heretofore described operates as follows: If the primary winding of the transformers 1 and 42 are connected to an alternating current source of supply, a voltage is induced in the corresponding secondary windings 1ᵇ and 42ᵇ, respectively. The secondary winding 1ᵇ in turn impresses a voltage upon the primary winding 11ª of the transformer 11. This induces a secondary voltage in the winding 11ᵇ and alternating voltages displaced by 180° from each other are impressed between the cathode 15ᶜ of the tube 15 and the anodes 15ª and 15ᵇ, respectively. This results in a rectified voltage being impressed upon the end terminals of the voltage divider 16 and a direct current flows through the voltage divider starting at the cathode 15ᶜ, through the inductance 17, through the voltage divider 16, back to the tap 11ᵉ of the winding 11ᵇ, alternately through one and the other half of the secondary winding 11ᵇ, to one or the other anode 15ª or 15ᵇ back to the cathode 15ᶜ. The inductance 17 and the condensers 18 and 19 serve in a well known manner to smooth out the ripples in the alternating current supplied to the voltage divider 16. The voltage existing between the positive terminals and the tap 16ª of the voltage divider 16 gradually charges the condenser 28, the rate of charge being controlled by the resistance of the resistor 27 and the voltage at the terminals of the condenser 28 gradually increases.

The transformer 14 is also energized so that the terminals 14ᵈ and 14ᶜ become alternately positive with respect to the center tap 14ᵉ. This causes successive half waves of alternating current to flow from the end terminal 14ᶜ, through the rectifier 20, winding 22ª, to the center tap 14ᵉ, back through one-half of the winding 14ᵇ, to the end terminal 14ᶜ, and alternately from the terminal 14ᵈ, through rectifier 21, winding 22ª, to the center tap 14ᵉ, through the other half of the winding 14ᵇ to the end terminal 14ᵈ. It will be apparent that during each half cycle of the alternating current of the line, the current in the winding 22ª rises from zero to a maximum value and back to zero. This induces an alternating voltage of twice the frequency of the line voltage in the secondary winding 22ᵇ and this in turn impresses a potential on the grid 26ᶜ, which alternates in polarity with respect to the cathode 26ª, the adjustment being such that during each half cycle of the line frequency the potential of the grid 26ᶜ will reach a critical value at which the tube becomes conducting, thereby discharging the condenser 28 and suddenly lowering the potential of the anode 26ᵇ with respect to its cathode and therefore also with respect to the negative terminal of the voltage divider 16. The potential variations of the anode 26ᵇ are impressed upon the circuit comprising the condenser 29 and the voltage divider 30, so that obviously the potential of the sliding contact 30ª and of the grid 31ᶜ with respect to the negative terminal of the voltage divider 16 and therefore also with respect to the cathode 31ª varies directly in accordance with the variations of the potential of the anode 26ᵇ. Hence the discharge current through the tube 31, which is a high vacuum tube, varies linearly with the potential variations of the condenser 28. The rate of charging the condenser 28 is determined by the value of the resistor 27 and also by the positive bias due to the voltage difference between the intermediate tap 16ª and the negative end terminal of the voltage divider 16, while the ratio between the potential variations of the anodes 31ᵇ and 26ᵇ is determined by adjustment of the sliding contact 30ª. The potential of the anode 31ᵇ is thus alternately impressed during alternate half cycles upon the grids 3ᶜ and 4ᶜ of the tubes 3 and 4.

The circuit through which the potential of anode $31^b$ is impressed upon the grids $3^c$ and $4^c$ is as follows: From the cathodes $3^b$ and $4^b$, through the upper part of the voltage divider 10, the contact $10^a$, condenser 8, resistor 33, upper part of resistor 16 to tap $16^b$, the resistor 35, to grid $3^c$ and alternately from tap $16^b$, through resistor 36, to grid $4^c$. The potentials of the grids $3^c$ and $4^c$ with respect to their corresponding cathodes may be modified by adjustment of the sliding contact $10^a$ which affords an adjustment of a positive biasing component. The grid potentials aforementioned may be further modified by any voltage which is induced in the winding $5^b$ as modified by the voltage drop through the resistor 7 and also by the potential of the sliding contact $16^b$ with respect to the total voltage drop through the voltage divider 16 as will be more fully explained hereinafter.

Figure 2:
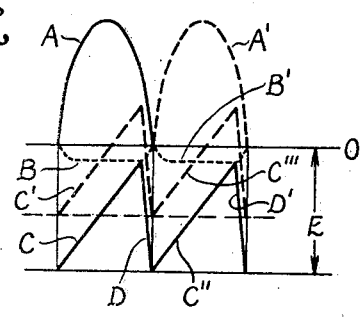
Fig. 2 is a diagram to illustrate the functioning of the control of certain gaseous discharge tubes forming part of the system.

The armature $2^a$ is supplied with alternate half-waves of rectified current from the transformer winding $1^b$, through the tubes 3 and 4. By varying the moment of the respective potential half-cycles at which the tubes 3 and 4 become conducting the effective current supplied to the motor armature $2^a$ may be varied. The way of changing the moment of starting the conduction of current through the tubes 3 and 4 will now be explained. Referring to Fig. 2 the curve A is the voltage available between the cathode and anode of the tube 3 during a given half cycle of said voltage. This is substantially the voltage between the center tap $1^c$ and the end tap $1^d$. During this half cycle the tube 3 will be rendered conducting if the grid potential is at least as high as, or more positive than, the ignition potential indicated by the curve B. During the half cycle represented by the curve A the condenser 28 is charged by the voltage between the tap $16^a$ and the positive tap of voltage divider 16 to gradually increasing potential, the increase being proportional to that indicated by the line C, and the condenser charge is reduced again substantially instantaneously at approximately the end of said half cycle as indicated by the curve D. The curves C and D represented in the diagram are actually the drop in potential across resistor 33, said drop varying directly in proportion to the change in the charge of the condenser 28, as has been described. It will be obvious therefore that when the potential C equals the value B, the tube 3 begins to conduct and it continues to conduct in a well known manner substantially to the end of the half cycle. To vary the point at which the line C of the grid potential with respect to the cathodes $3^b$ intersects the curve B, a positive direct current bias E is added to the potential C resulting in a potential C' thereby shifting the moment when the potential line intersects the curve B. This variable positive bias voltage E is supplied by the voltage drop between the sliding contact $16^b$ and the positive end terminal of the voltage divider 16.

During the next half cycle an available voltage A' is impressed upon the tube 4 and the moment when it starts conducting depends upon the moment at which the line C''' intersects the critical or ignition curve B'. During the half cycle represented by the curve A' the potential of the anode $31^b$ with respect to its cathode $31^a$ is represented by the line C'', while the variable voltage E is represented by the voltage drop between the movable contact $16^b$ and the positive end terminal of the voltage divider 16 as has been described heretofore. It will thus be seen that during alternate half cycles a voltage which is the resultant of a saw-tooth voltage and an adjustable constant voltage is alternately impressed upon the grids $3^c$ and $4^c$ to make the respective tubes conducting.

To advance the moment at which the respective tubes 3 and 4 become conducting, the contact $16^b$ is moved toward the positive end terminal of the voltage divider 16 thereby decreasing the component E and raising the lines C' and C'''. On the other hand, if the bias voltage E is sufficiently increased the line C never intersects the curve B so that no current will flow from the transformer to the motor armature during the respective half cycle. By decreasing the voltage E the curve C may be raised so that it intersects the curve B substantially at the beginning of the respective half cycle and therefore the maximum effective current will be supplied to the armature during the respective half cycle. Thus it is possible to vary within very wide limits the effective current which the armature $2^a$ receives from the transformer 1.

The resistor 12 and the condenser 13 form a phase-shifting network. In order to assure that charging of the condenser 28 starts at the moment when the voltage A (Fig. 2) passes through zero and is again suddenly discharged substantially at the end of the half cycle, the resistor 12 and the condenser 13 have to be proportioned relatively to each other in a manner well known to those skilled in the art. This assures that the grid $26^c$ renders the tube 26 conducting substantially at the moment when the alternating voltage impressed upon the tubes 3 and 4, respectively, passes through zero.

A motor usually requires maximum torque for starting from standstill, whereas during acceleration the torque required is less than the maximum. Provision is therefore made to limit the rate of rise of the armature current during acceleration or sudden changes in load. For this purpose the series transformer 5 is arranged to impress on the circuit of the grids $3^c$ and $4^c$, a supplemental potential which tends to increase the negative bias on the grids $3^c$ and $4^c$, respectively. As long as the current in the winding $5^a$ remains constant, only a negligible voltage is induced in the secondary winding $5^b$. If, however, the current in $5^a$ should suddenly change, it induces a corresponding electromotive force in the secondary winding $5^b$, the polarity varying with the direction of change. In order to prevent a sudden decrease of the current through the primary winding $5^a$ from increasing the grid potential of the tubes 3 and 4, the rectifiers 6 and 9 are provided to block flow of a reverse current to the condenser 8. The potential derived from the secondary winding $5^b$ is added to the potential E so as to delay the moment of intersection of line C with the curve B and thereby delay the moment of ignition of the tubes 3 and 4 during the respective half cycle.

The system disclosed in Fig. 1 also provides compensation for variations in the terminal voltage impressed upon the armature $2^a$. To accomplish this the resistor 10 has impressed upon it the terminal voltage of the armature $2^a$. A part of said resistor is connected by means of the movable contact $10^a$ in series with the winding $5^b$ and the voltage drop therein which is a function of the armature voltage is thus impressed upon the grids $3^c$ and $4^c$, the arrangement being such that for an abnormal armature voltage, the additional bias is added to or subtracted from the voltage E so as to advance or retard the moment of ignition for restoration of normal armature voltage.

The total potential impressed upon the grids 3c and 4c with respect to the cathodes 3b and 4b is therefore composed of the following: The voltage drop in the resistor 10 between the cathodes 3b and 4b and the movable contact 10a, the voltage that may be induced in the winding 5b by a sudden increase of the armature current, the voltage drop across the resistor 33, and the voltage drop between the positive end of the voltage divider 16 and the movable contact 16b.

The field current of the motor 2 is controlled in the following manner:

As long as the armature voltage is below a certain value, that is, below that voltage which corresponds to the normal speed of the armature with full field excitation, the contact 46b of relay 46 is closed. As soon as the motor reaches normal speed the winding 46a is sufficiently energized to open the contacts 46b. The grids 40c and 41c are alternately energized through the transformer winding 42b in such a manner that the tubes 40 and 41 are conducting during the corresponding half cycle during which the respective anodes are positive with respect to their cathodes, so that with the contact 46b closed the field winding 2b receives maximum energizing current. When the contact 46b opens, the voltage which is impressed upon the grids 40c and 41c is reduced so that initiation of conduction of the tubes 40 and 41 is delayed after the passage of the voltage through zero for a time depending upon the phase displacement of the grid voltages with respect to the cathode voltages, depending upon the displacement of the adjustment of the movable contact 45b. Hence after the contact 46b has opened, the speed of the motor may be varied by varying the adjustment of the movable contact 45b. It will be recognized that the voltage which is impressed upon the grids referred to is the resultant of the inductive voltage of the condenser 44 and the non-inductive voltage drop through the resistor 45. As the effective value of the resistor 45 is varied by adjustment of contact 45b, the non-inductive component likewise varies, thus varying the phase displacement of the grid voltage with respect to the voltage of the tubes 40 and 41 in the usual manner.

It will be apparent that by certain duplications the invention may also be employed in a system comprising a polyphase source of alternating current supply with a plurality of tubes greater than two interposed between the supply and the translating circuit.

Other modifications within the scope of the invention as disclosed in the embodiment described and claimed herein will be apparent to those skilled in the art.

I claim:

1. The method of controlling the starting moment of a periodic electronic discharge which comprises producing a saw-tooth voltage bearing a definite time relation to the periodic discharge to be controlled and obtaining at any given moment in each period the critical voltage for initiation of discharge by varying the amplitude of the saw tooth voltage relative to a base line, while maintaining a fixed time relation between said voltage and the voltage available for the discharge.

2. The method of controlling the starting moment of a periodic electronic discharge which comprises producing a saw-tooth voltage bearing a definite time relation to the periodic discharge to be controlled, producing also a constant unidirectional voltage, superimposing said voltages to provide a modified saw-tooth resultant voltage and varying said resultant voltage by varying the value of said constant voltage.

3. In a system, comprising, a translating circuit, a source of alternating current and a discharge tube having a cathode, an anode and a control electrode and connected to said translating circuit and to said source to conduct current from said source to said circuit, the combination with a tube of said character, of means to generate a saw-tooth voltage bearing a definite time relation to the voltage impressed upon said tube by said source and to impress said saw-tooth voltage between said cathode and control electrode, and means to modify said saw-tooth voltage while maintaining said definite time relation to effect initiation of current conduction through said tube at any given moment of the positive half cycle of said voltage impressed by said source upon said tube.

4. In a system, comprising, a translating circuit, a source of alternating current and a discharge tube having a cathode, an anode and a control electrode and connected to said circuit and to said source to conduct current from said source to said circuit, the combination with a tube of said character, of means to generate a saw-tooth voltage of a frequency which is double that of the voltage impressed upon said tube by said source and to impress said saw-tooth voltage between said cathode and control electrode, and means to modify said saw-tooth voltage while maintaining said frequency relation, to effect initiation of current conduction through said tube at any given moment of the positive half cycle of said voltage impressed by said source upon said tube.

5. In a system, comprising, a translating circuit, a source of alternating current and a discharge tube having a cathode, an anode and a control electrode, which tube is connected to said circuit and to said source to conduct current from said source to said circuit, the combination with a tube of said character, of means to generate a saw-tooth voltage bearing a definite time relation to the voltage impressed upon said tube by said source and to impress said saw-tooth voltage between said cathode and said control electrode, means to supply another voltage and to superimpose said latter voltage upon said saw-tooth voltage to modify the effect of the saw-tooth voltage upon said tube, and means to vary the magnitude of said superimposed voltage to afford a resultant voltage between said cathode and control electrode which will initiate current conduction by said tube at any given moment of the positive half cycle of the voltage impressed by said source upon said tube.

6. In a system, comprising, a translating circuit, a source of alternating current and a discharge tube having a cathode, an anode, and a control electrode and connected to said circuit and to said source to conduct current from the latter to the former, the combination with a tube of said character, of means to generate a saw-tooth voltage of a frequency which is double that of said alternating current source and to impress said saw-tooth voltage between said cathode and control electrode, means to supply a unidirectional voltage and to superimpose it upon said saw-tooth voltage to modify the effect of the saw-tooth voltage upon said tube, and means to vary the magnitude of said unidirectional voltage, to afford a resultant voltage between said cathode and control electrode which will initiate current conduction by said tube at any given moment of the positive half cycle of the voltage impressed by said source upon said tube.

7. The combination, with a source of alternating current, a direct current translating device and a discharge tube having a cathode, an anode and a control electrode and connected to said source and to said device to conduct current from the former to the latter, of a saw-tooth oscillator whose output frequency bears a definite time relation to the frequency of said source and connected to impress an oscillatory voltage between said cathode and control electrode, and means to superimpose a direct current voltage upon said saw-tooth voltage and to vary said direct current voltage to afford a resultant voltage between said cathode and control electrode which at any given moment of the positive half cycle of the voltage impressed by said source upon said tube will initiate current conduction by said tube.

8. The combination with a source of alternating current, a direct current translating device and a discharge tube having a cathode, an anode and a control electrode and connected to said source and to said device to conduct current from the former to the latter, of a saw-tooth oscillator whose output frequency bears a definite time relation to the frequency of said source and connected to impress an oscillating voltage between said cathode and control electrode, the moments of reversal of the variations of said oscillating voltage coinciding substantially with the moments of zero voltage of said alternating voltage, means to superimpose a direct current voltage upon said saw-tooth voltage, and means to vary said direct current voltage to afford a resultant voltage between said cathode and control electrode which at any given moment of the positive half cycle of the voltage impressed by said source upon said tube will initiate current conduction by said tube.

9. In a system for controlling the energy supplied by an alternating current source to a translating circuit, the combination of electric discharge means adapted to be connected in circuit with a source of alternating current for conducting current from said source to a translating circuit during positive half cycles of the alternating current voltage impressed upon said discharge means by said source, said discharge means having control means to effect initiation of current conduction through said discharge means, means to provide a periodic potential varying substantially linearly and attaining a maximum at the end of each positive half cycle of the voltage impressed upon said discharge means by said source and decreasing to a given minimum by the beginning of the next succeeding positive half cycle, means to superimpose a substantially constant unidirectional potential upon said periodic potential, and means to impress the resultant of said potentials upon a control element of said discharge means for initiating current conduction by said discharge means at any given moment of said positive half cycles.

10. In a system for controlling the energy supplied by an alternating current source to a translating circuit, the combination, of a first gaseous discharge tube having a cathode, an anode and a control electrode and being adapted to be connected in circuit with an alternating current source for conducting current from said source to said translating circuit during the positive half cycle of the alternating voltage impressed upon said first tube by said source, a condenser, a resistor and a charging source connected in circuit with said condenser for charging the latter, a second gaseous discharge tube having a cathode, an anode and a control electrode, said cathode and anode of said second tube being connected in circuit with said condenser to discharge the same in response to a potential impressed upon said control electrode of said second tube, the latter control electrode being connected to said alternating current source to initiate current conduction by said second tube after initiation of current conduction by said first tube and to block initiation of current conduction by said second tube during a given interval of the positive half cycles of the voltage impressed by said alternating current source upon said first tube, means to impress upon the control electrode of said first tube a potential which is a function of the charge of said condenser, and means to superimpose an adjustable unidirectional potential upon the potential impressed upon the control electrode of said first tube, to initiate current conduction by said first tube at any given moment of said positive half cycles.

11. In a system for controlling the moment of ignition of a gaseous discharge tube connected to an alternating current source of supply, in combination a first gaseous discharge tube having a cathode, an anode and a control electrode, and adapted to be connected in circuit with an alternating current source to have impressed upon it an alternating voltage from said source, a condenser, a resistor and a charging source connected in circuit with said condenser for charging said condenser, a second gaseous discharge tube having a cathode, an anode, and a control electrode, said cathode and anode of said second tube being connected in circuit with said condenser to discharge the same substantially instantaneously in response to a potential impressed upon the control electrode of said second tube, means to impress upon the last-named control electrode a potential to render the second tube conducting during the positive half cycle of the voltage impressed by said alternating current source upon said first tube, means to impress upon the control electrode of said first tube a potential which is a function of the charge of said condenser, and means to superimpose an adjustable unidirectional potential upon said last-named potential.

12. In a system for controlling the energy supplied by an alternating current source to a translating circuit, the combination with a first gaseous discharge tube having a cathode, an anode, and a control electrode and adapted to be connected in circuit with an alternating current source for conducting current from said source to a translating circuit during the positive half cycle of the alternating current voltage impressed upon said first tube by said source, of a condenser, a resistor and a charging source connected in circuit with said condenser for charging said condenser, a second gaseous discharge tube having a cathode, an anode and a control electrode, said cathode and anode of said second tube being connected in circuit with said condenser to discharge the same substantially instantaneously in response to a potential impressed upon said control electrode of said second tube, connections between said latter control electrode and said alternating current source to render said second tube conducting at the moment when the voltage impressed by said alternating current source upon said first tube passes through zero from a positive to a negative value, a connection between said condenser and the control electrode of said first tube to impress upon said latter control electrode a voltage which is a function of the charge of said condenser, means to superimpose an adjustable unidirectional potential upon the voltage impressed by said condenser upon the control electrode of said first tube, means to vary the effect of said unidirectional potential upon the control electrode of said first tube, and means connectable to the terminals of said translating circuit to respond to the voltage therebetween, and to superimpose an additional voltage which is a function of said terminal voltage upon the control electrode of said first tube.

13. In a system for controlling the energy supplied by an alternating current source to a translating device, the combination with a first gaseous discharge tube having a cathode, an anode and a control electrode and being adapted to be connected in circuit with an alternating current source for conducting current from said source to a translating device during the positive half cycle of the alternating current voltage impressed upon said first tube by said source, of a condenser, a resistor and a charging source connected in circuit with said condenser for charging said condenser, a second gaseous discharge tube having a cathode, an anode and a control electrode, said cathode and anode of said second tube being connected in circuit with said condenser to discharge the same substantially instantaneously in response to a potential impressed upon said control electrode of said second tube, connections between said latter control electrode and said alternating current source to render said second tube conducting at the moment when the voltage impressed by said alternating current source upon said first tube passes through zero from a positive to a negative value, a connection between said condenser and the control electrode of said first tube, to impress upon said latter control electrode a voltage which is a function of the charge of said condenser, means to superimpose an adjustable unidirectional potential upon the voltage impressed by said condenser upon the control electrode of said first tube, means to vary the effect of said unidirectional potential upon the control electrode of said first tube, means connectable to said translating device and responsive to generate a voltage proportional to the rate of variation of the current supplied to said translating device, and means to superimpose a resultant of said last-named voltage upon the control electrode of said first tube.

14. In a system for controlling the energy supplied by an alternating current source to a translating device, the combination with a first gaseous discharge tube having a cathode, an anode, and a control electrode, and being adapted to be connected in circuit with a source of alternating current for conducting current from said source to a translating device during the positive half cycle of the alternating current voltage impressed upon said first tube by said source, of a condenser, a resistor and a charging source connected in circuit with said condenser for charging said condenser, a second gaseous discharge tube having a cathode, an anode and a control electrode, said cathode and anode of said second tube being connected in circuit with said condenser to discharge the same substantially instantaneously in response to a potential impressed upon said control electrode of said second tube, connections between said latter control electrode and said alternating current source to render said second tube conducting at the moment when the voltage impressed by said alternating current source upon said first tube passes through zero from a positive to a negative value, a connection between said condenser and the control electrode of said first tube, to impress upon the control electrode of said first tube a voltage which is a function of the charge of said condenser, means to superimpose an adjustable and unidirectional potential upon the voltage impressed by said condenser upon the control electrode of said first tube, means to vary the effect of said unidirectional potential upon the control electrode of said first tube, means connectable to said translating device and responsive to the terminal voltage thereof and adapted to superimpose upon the control electrode of said first tube an additional voltage which is a function of said terminal voltage, means connectable to said translating device and responsive to induce a voltage proportional to the rate of increase of the current supplied to said translating device, and means to superimpose a resultant of said induced voltage upon the control electrode of said first tube.

15. In a motor control system comprising the combination with a motor, of a source of alternating current and a gaseous discharge tube having a cathode, an anode and a control electrode and connected in circuit with said motor and said source, to conduct current from the latter to the former, means to generate a saw-tooth voltage of a frequency which is double that of said alternating current source, means to impress said saw-tooth voltage between said cathode and control electrode, means to supply a unidirectional voltage and to superimpose it upon said saw-tooth voltage, and means to vary said unidirectional voltage to afford a resultant voltage between said cathode and control electrode which will initiate current conduction of said tube at any given moment of the positive half cycles of the voltage impressed upon said tube by said source.

16. The combination of, a source of alternating current, a direct current motor, a gaseous discharge tube having a cathode, an anode and a control electrode and connected in circuit with said source and said motor to conduct current from the former to the latter, a saw-tooth oscillator whose output frequency is twice the frequency of said source and connected to impress a voltage between said cathode and control electrode, the moments of reversal of the variations of said saw-tooth voltage coinciding substantially with the moments of zero voltage of said alternating voltage, means to superimpose a direct current voltage upon said saw-tooth voltage, and means to vary said direct current voltage to afford a resultant voltage between said cathode and control electrode which will initiate current conduction by said tube at a desired moment of the positive half cycles of the voltage impressed upon said tube by said alternating current source.

17. In a system for controlling the energy supplied by an alternating current source to a motor, the combination of a gaseous discharge tube adapted to be connected in circuit with a source of alternating current and a motor for conducting current from said source to said motor during the positive half cycle of the alternating current voltage impressed upon said tube by said source, said tube having a cathode, an anode and a control electrode, means to provide a periodic potential varying substantially linearly from a minimum to a maximum during said positive half cycles and to drop substantially instantaneously to said minimum at the end of said positive half cycles, means to superimpose a substantially constant unidirectional potential upon said periodic potential, and means to impress the resultant of said last named potentials upon the control electrode of said tube for varying the moment when said tube becomes conducting during said positive half cycles.

18. In combination, a motor, an alternating current source, a first gaseous discharge tube adapted to be connected in circuit with said source for conducting current from said source to said motor during the positive half cycle of the alternating current voltage impressed upon said first tube by said source, said first tube having a cathode, an anode and a control electrode, a condenser, a resistor and a charging source connected in circuit with said condenser for charging said condenser, a second gaseous discharge tube having a cathode, an anode and a control electrode, said cathode and anode being connected in circuit with said condenser to discharge the same substantially instantaneously in response to a potential impressed upon said last named control electrode, said last named control electrode being connected to said alternating current source to render said second tube conducting at the moment when the voltage impressed upon said first tube passes through zero from a positive to a negative value, a connection to impress the voltage of the condenser upon the control electrode of said first tube, a source of unidirectional potential connected to said condenser to superimpose a unidirectional potential upon the potential impressed by said condenser upon the control electrode of said first tube, and means to vary the effect of said unidirectional potential upon the control electrode of said first tube for varying the moment when said first tube becomes conducting during said positive half cycles.

19. In combination, a motor, an alternating current supply source, a first gaseous tube having a cathode, an anode and a control electrode and being adapted to be connected in circuit with said alternating current source and said motor for conducting current from the former to the latter during the positive half cycles of the voltage impressed upon said tube by said source, a condenser, a resistor and a charging source connected in circuit with said condenser for charging said condenser, a second gaseous discharge tube having a cathode, an anode and a control electrode, said latter cathode and anode being connected in circuit with said condenser to discharge the same substantially instantaneously in response to a potential impressed upon said control electrode of said second tube, means to impress upon said last named control electrode a potential to render the second tube conducting at the moment when the voltage impressed upon said first tube passes through zero from a positive to a negative value, a connection to impress upon the control electrode of the first tube a voltage which is a function of the voltage supplied by said condenser, a source of adjustable unidirectional potential connected to said condenser to superimpose a unidirectional potential upon the potential impressed by said condenser upon the control electrode of said first tube, and means to vary the effect of said unidirectional potential upon the control electrode of said first tube for varying the moment when said first tube becomes conducting during said positive half cycles.

20. In combination, a motor, an alternating current supply source, a first gaseous discharge tube adapted to be connected in circuit with said source for conducting current from said source to said motor during the positive half cycle of the alternating current voltage impressed upon said first tube by said source, said first tube having a cathode, an anode and a control electrode, a condenser, a resistor, a charging source for charging said condenser connected in circuit with said condenser, a second gaseous discharge tube having a cathode, an anode and a control electrode, said cathode and anode of said second tube being connected in circuit with said condenser to discharge the same substantially instantaneously in response to a potential impressed upon said control electrode of said second tube, said latter control electrode being connected to said alternating current source to render said second tube conducting at the moments when the voltage impressed by said alternating current source upon said first tube passes through zero from a positive to a negative value, connections between said condenser and the control electrode of said first tube to impress upon said last mentioned control electrode a voltage which is a function of the voltage of said condenser, a source of adjustable unidirectional potential connected to said condenser for superimposing a unidirectional potential upon the potential impressed by said condenser upon the control electrode of said first tube, means to vary the effect of said unidirectional potential upon said control electrode of said first tube, and means responsive to the terminal voltage of said motor to superimpose an additional voltage which is a function of said terminal voltage upon the control electrode of said first tube.

21. In combination, a motor, an alternating current supply source, a first gaseous discharge tube connected in circuit with said source for conducting current from said source to said motor during the positive half cycles of the alternating current voltage impressed upon said first tube by said source, said first tube having a cathode, an anode and a control electrode, a condenser, a resistor connected in circuit with said condenser, a charging source for charging said condenser, a second gaseous discharge tube having a cathode, an anode and a control electrode, said cathode and anode of said second tube being connected in circuit with said condenser to discharge the same substantially instantaneously in response to a potential impressed upon said control electrode of said second tube, said latter control electrode being connected to said alternating current source to render said second tube conducting at the moments when the voltage impressed upon said first tube by said alternating current source passes through zero from a positive to a negative value, connections between said condenser and the control electrode of said first tube to impress upon said last named control electrode a voltage which is a function of said condenser voltage, a source of adjustable unidirectional potential connected to said condenser for superimposing a unidirectional potential upon the potential impressed by said condenser upon the control electrode of said first tube, means to vary the effect of said unidirectional potential upon said control electrode of said first tube, means to generate a voltage proportional to the rate of variation of the current supplied to said motor, and means to superimpose a voltage which is a function of said last named voltage upon the control electrode of said first mentioned tube.

22. In combination, a motor, an alternating current supply source, a first gaseous discharge tube adapted to be connected in circuit with said source for conducting current from said source to said motor during the positive half cycles of the alternating current voltage impressed upon said first tube by said source, said first tube having a cathode, an anode, and a control electrode, a condenser, a resistor connected in circuit with said condenser, a charging source for charging said condenser, a second gaseous discharge tube having a cathode, an anode and a control electrode, said cathode and anode of said second tube being connected in circuit with said condenser to discharge the same substantially instantaneously in response to a potential impressed upon said control electrode of said second tube, said last named control electrode being connected to said alternating current source to render said second tube conducting at the moments when the voltage impressed upon said first tube by said alternating current source passes through zero from a positive to a negative value, a connection between said condenser and the control electrode of said first tube to impress upon said last named control electrode a voltage which is a function of said condenser voltage, a source of adjustable unidirectional potential connected to said condenser for superimposing a unidirectional potential upon the potential impressed by said condenser upon the control electrode of said first tube, means to vary the effect of said unidirectional potential upon said control electrode of said first tube, means responsive to the terminal voltage of said motor to superimpose upon the control electrode of said first tube an additional voltage which is a function of said terminal voltage, means to induce a voltage proportional to the rate of increase of the current supplied to said motor, and means to superimpose a voltage which is a function of said induced voltage, upon the control electrode of said first mentioned tube.

23. In combination a direct current motor, a source of alternating current, a pair of gaseous discharge tubes each having a cathode, an anode and a control electrode and connected in circuit with the motor armature and said source to alternately supply the former with successive half waves of energy from the latter, means to generate a saw-tooth voltage of a frequency which is double that of said alternating current source, means to impress successive cycles of said saw-tooth voltage alternately between the cathode and control electrode of the respective tube, means to supply an adjustable unidirectional voltage and to superimpose it upon said saw-tooth voltage to modify the effect of the latter upon said tubes, and means to vary the magnitude of said unidirectional voltage to afford a resultant voltage which at given moments of the positive half cycles of the voltage impressed upon the tubes by said source initiates current conduction by said tubes.

24. In combination, a source of alternating current, a direct current motor, a pair of gaseous discharge tubes each having a cathode, an anode and a control electrode and connected in circuit with said source and the motor armature to alternately supply successive half waves of energy from the former to the latter, a saw-tooth oscillator whose output frequency is twice the frequency of said source and connected to impress successive cycles of its voltage between the cathode and control electrode of said tubes alternately, the moments of reversal of said saw-tooth voltage coinciding substantially with the moments of zero voltage of said half waves, means to superimpose a direct current voltage upon said saw-tooth voltage, and means to vary said direct current voltage to afford a resultant voltage which at given moments of half cycles initiates current conduction by said tubes.

25. In combination, an alternating current source, a direct current motor, a pair of gaseous electron tubes connected in circuit with said source and the motor armature for alternately conducting successive half-waves of energy from said source to said armature during the positive half cycles of the alternating current voltage impressed upon the respective tube by said source, each of said tubes having a cathode, an anode and a control electrode, means to provide a periodic potential varying substantially linearly from a minimum to a maximum during said voltage half cycles and to drop substantially instantaneously to said minimum at the end of said half cycles, means to superimpose a unidirectional potential upon said periodic potential, and means to impress the resultant of said last-named potentials between the cathode and control electrode of each tube for varying the moments when each such tube becomes conducting during the respective positive half cycles.

JAMES B. REEVES.

REFERENCES CITED

The following references are of record in the file of this patent:

UNITED STATES PATENTS

| Number | Name | Date |
| --- | --- | --- |
| 1,944,756 | Quarles | Jan. 23, 1934 |
| 2,080,250 | Bedford | May 11, 1937 |
| 2,312,117 | Moyer et al. | Feb. 23, 1939 |